United States Patent [19]

Feiring

[11] Patent Number: 4,525,539

[45] Date of Patent: Jun. 25, 1985

[54] VULCANIZABLE NITRILE-CONTAINING PERFLUOROELASTOMER

[75] Inventor: Andrew E. Feiring, Wilmington, Del.

[73] Assignee: E. I. Du Pont de Nemours and Company, Wilmington, Del.

[21] Appl. No.: 446,227

[22] Filed: Dec. 2, 1982

[51] Int. Cl.$^3$ .................. C08F 220/70; C08F 220/42; C08F 8/32; C08F 8/34
[52] U.S. Cl. ................................. 525/326.3; 525/351; 525/380; 525/381; 526/247
[58] Field of Search .................... 525/326.3, 351, 353, 525/380, 381, 382

[56] References Cited

U.S. PATENT DOCUMENTS

| | | | |
|---|---|---|---|
| 3,332,907 | 7/1967 | Angelo et al. | 528/326.3 |
| 3,467,638 | 9/1969 | Pattison | 525/326.3/ |
| 3,580,889 | 5/1971 | Barney et al. | 525/326.3 |
| 3,859,259 | 1/1975 | Harrell | 525/326.3 |
| 4,281,092 | 7/1981 | Breazeale | 526/247 |

FOREIGN PATENT DOCUMENTS 755788  8/1956  United Kingdom ............ 525/326.3

Primary Examiner—Christopher A. Henderson

[57] ABSTRACT

Vulcanizable nitrile-containing perfluoroelastomer polymers can be cured by reaction with certain bis(aminophenols) or tetraamines.

10 Claims, No Drawings

VULCANIZABLE NITRILE-CONTAINING PERFLUOROELASTOMER

TECHNICAL FIELD

This invention relates to vulcanizable nitrile-containing perfluoroelastomer compositions, said compositions containing a curing agent selected from the group consisting of certain bis(aminophenols) and certain tetraamines, and to a method of vulcanizing nitrile-containing pefluoroelastomer polymer with a compound selected from the group consisting of certain bis(aminophenols) and certain tetraamines. The perfluoroelastomer polymers that can be vulcanized by the method of the present invention include those derived from tetrafluoroethylene, perfluoromethyl perfluorovinyl ether, and a nitrile-containing cure-site monomer. Such polymers can be vulcanized to useful elastomeric materials characterized by excellent physical properties and resistance to environmental attack. These materials can be fabricated into mechanical parts such as O-rings, flange seals, gasket stock, pump diaphragms and liners and are particularly useful where extraordinary resistance to heat and corrosive fluids is required. In particular, this invention relates to a new vulcanizing agent for such perfluoroelastomer polymers, the method of vulcanizing such perfluoroelastomer polymers with the new vulcanizing agent, and the vulcanizable perfluoroelastomer compositions containing perfluoroelastomer and the new vulcanizing agent. Further, this invention relates to the superior properties of the finished parts made from the composition of the present invention and made by the method of the present invention, such improved properties including higher hydrolytic and thermal stability of the finished perfluoroelastomer parts.

BACKGROUND ART

U.S. Pat. No. 4,281,092, granted July 28, 1981 to Breazeale, discloses vulcanizable perfluoroelastomer polymers comprising copolymerized units of
  (a) 53–79.8 mole percent tetrafluoroethylene,
  (b) 20–45 mole percent perfluoromethyl perfluorovinyl ether, and
  (c) 0.2–2 mole percent of a cure-site monomer of the formula:

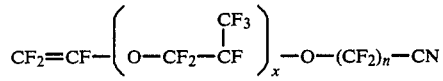

where
  n=1–4 and
  x=1–2.

These polymers are the same as are used in the method and composition of the present invention. Breazeale discloses vulcanization of these polymers with substances known to promote the formation of trazine rings by trimerization of nitriles, e.g. organometallic compounds of arsenic, antimony and tin and certain metal oxides. The preferred vulcanizing agent is disclosed to be tetraphenyltin. Use of the present invention, rather than vulcanizing with tetraphenyltin, gives finished product having higher hydrolytic stability and higher thermal stability. In addition, the method and composition of the present invention provides a convenient alternative to the curing system heretofore recommended for the polymers disclosed by Breazeale.

U.S. Pat. No. 3,467,638, granted Sept. 16, 1969 to Pattison, discloses certain vulcanizable fluorocarbon polymers. In particular, among the many and varied copolymers described by Pattison there are specifically disclosed terpolymers derived from tetrafluoroethylene, perfluoromethyl perfluorovinyl ether, and a cure-site monomer of the formula

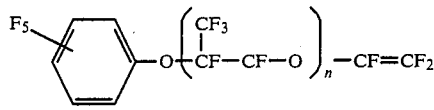

where n is 1 or 2. Pattison discloses vulcanization of these polymers with an aliphatic diamine, generally containing from 2–20 carbon atoms, e.g. p-phenylene diamine, tetramethylamine pentamine, and hexamethylene diamine carbamate.

U.S. Pat. No. 3,580,889, granted May 25, 1971 to Barney and Honsberg, discloses accelerators that can be used to speed the vulcanization of certain fluorinated polymers. Included among the many and varied fluorinated polymers mentioned are polymers derived from tetrafluoroethylene, perfluoro(alkyl vinyl ethers) and perfluoro(2-phenoxypropyl vinyl ether); included among the many and varied vulcanizing agents mentioned is 2,2-bis(4-phenylol) perfluoropropane (i.e. bisphenol AF); and included among the many and varied accelerators mentioned is 2,5,8,15,18,21-hexaoxatricyclo [20.4.0.0$^{9.14}$] hexacosane (i.e. dicyclohexyl 18-crown-6). In fact the most commonly used vulcanizing agent for the polymers of Pattison is a mixture of bisphenol AF and DCH 18-crown-6.

SUMMARY OF THE INVENTION

The present invention relates to vulcanizable nitrile-containing perfluoroelastomer compositions, said compositions containing as the curing agent a compound selected from the group consisting of certain bis(aminophenols) and certain tetraamines. More specifically, the perfluoroelastomer compositions of the present invention comprise a nitrile-containing perfluoroelastomer polymer and a vulcanizing agent for that polymer. The perfluoroelastomer polymer comprises copolymerized units of:
  (a) 53–79.8 mole percent tetrafluoroethylene,
  (b) 20–45 mole percent perfluoromethyl perfluorovinyl ether, and
  (c) 0.2–2 mole percent of a cure-site monomer of the formula:

(1)

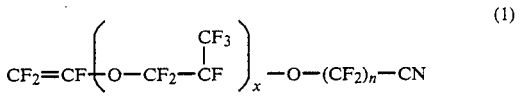

where n=1–4 and x=1–2.
The vulcanizing agent is a compound selected from the group consisting of bis(aminophenols) of the formula

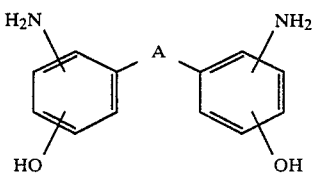

and tetraamines of the formula

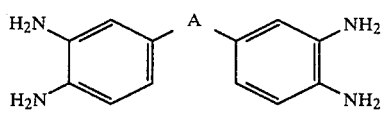

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formula (2), above, are interchangeably in the meta and para positions with respect to the group A.

Preferably, the perfluoroelastomer polymer will be comprised of copolymerized units of 64.4–72.6 mole percent tetrafluoroethylene, 27–35 mole percent perfluoromethyl perfluorovinyl ether and 0.4–1.0 mole percent of a compound of formula (1). The most preferred perfluoroelastomer polymer will be comprised of copolymerized units of approximately 69.3 mole percent tetrafluoroethylene, 30 mole percent perfluoromethyl perfluorovinyl ether and 0.7 mole percent of the compound of formula (1) where n=2 and x=1, i.e. perfluoro-(2-cyano-5-methyl-3,6-dioxa-1-octene). The composition of these terpolymers can be estimated from their infrared spectra. The perfluoromethyl perfluorovinyl ether content can be calculated from the intensity of the 11.25μ band which is characteristic of the trifluoromethoxyl group. The cure-site monomer content can be determined from the intensity of the band near 10.2μ which is characteristic of the perfluoroisopropylidene group. These perfluoroelastomer polymers can be prepared as disclosed in U.S. Pat. No. 4,281,092, granted July 28, 1981 to Breazeale, the subject matter of which is incorporated herein by reference.

Preferably, the vulcanizing agent is a compound selected from the group consisting of (a) 4,4′-[2,2,2-trifluoro-1-(trifluoromethyl)-ethylidene]bis(2-aminophenol),
(b) 4,4′-sulfonylbis(2-aminophenol),
(c) 3,3′-diaminobenzidene, and
(d) 3,3′,4,4′-tetraaminobenzophenone.

Compound (a) is most preferred and will hereinafter be referred to as bis(aminophenol) AF. The vulcanizing agents used in the method and composition of the present invention can be prepared as disclosed in U.S. Pat. No. 3,332,907, granted July 25, 1967 to Angelo et al, the subject matter of which is incorporated herein by reference. The preferred vulcanizing agent (bis(aminophenol)AF) can be prepared by nitration of 4,4′-[2,2,2-trifluoro-1-(trifluoromethyl) ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst.

The vulcanizable perfluoroelastomer compositions can be mixed with fillers, reinforcing agents, stabilizers, plasticizers, lubricants or processing aids prior to vulcanization. The most frequently used of these is carbon black which acts as a filler, reinforcer, light screen and antioxidant. A cyclic polyether can also be added as a processing aid. The vulcanization rate and environmental stability of the product can be improved by certain additives, especially lead oxide (litharge).

The nitrile containing polymer, the curing agent and other additives can be mixed together by conventional means, such as a two-roll mill at 40° to 100° C. The mixed composition can be shaped and vulcanized by pressing into a mold and heating at 160° to 250°, preferably 177° to 210° C., for 30–60 minutes. It is preferred to post cure the piece by heating it in an inert atmosphere, e.g. nitrogen, for a number of hours at a higher temperature.

The amount of vulcanizing agent should be chosen to optimize the desired properties of the vulcanizate. In general, a slight excess of curing agent over the amount required to react with all the cure sites present in the polymer is used. Typically 0.5–5.0 parts by weight of the curative per 100 parts of polymer is required; the preferred range is 1.0–2.0 parts.

Fluoroelastomers are vulcanized according to this invention, they have excellent thermal and oxidative stability and better steam resistance as compared to the prior art compositions. In addition this invention permits the vulcanization of nitrile cure site fluoroelastomers without the use of organometallic compounds which may be undesirable in certain applications.

The following examples illustrate the preparation, formulation and use of the preferred compositions of the present invention, including the preparation of the vulcanizing agent used in the preferred compositions of the present invention. All parts and percentages are by weight and all temperatures are in degrees Celsius unless otherwise specified. Measurements not originally in SI units have been so converted and rounded where appropriate.

EXAMPLE 1

Synthesis of Bis(nitrophenol)AF
(4,4′-2,2,-Trifluoro-1-(trifluoromethyl)-ethylidene]-bis(2-nitrophenol)]

Potassium nitrate (30.3 g., 0.3 mole) was added in small portions over 0.5 hr to a solution of 33.6 g (0.1 mole) of bisphenol AF (i.e. 4,4′-[2,2,2-trifluoro-1-(trifluoromethyl)ethylidene]bisphenol) in 200 ml trifluoroacetic acid. The temperature was maintained at 21°–25° C. by occasional use of a cold water bath. The resulting solution was stirred one hour and poured into 600 ml of ice water. The resultant precipitate was filtered, washed with water and air dried overnight giving 45.1 g of brown solid. A 15.6 g portion of the solid was bulb-to-bulb distilled at 0.4 mm and 190° giving 12 g of the yellow glass; nmr (δCDCl$_3$) 7.2–7.9 (2H, m), 8.3 (1H,S), 10.7 (1H,S); Anal. Calcd for C$_{15}$H$_8$F$_6$N$_2$O$_6$: C, 42.3; H, 1.9; N, 6.6. Found C, 41.6; H, 1.8; N, 6.1.

EXAMPLE 2

Synthesis of Bis(nitrophenol)AF

Potassium nitrate (73 g., 0.725 mole) was added in small portions over 1 hr to a solution of 108.25 g (0.322 mole) of bisphenol AF in 400 ml trifluoroacetic acid. The temperature was maintained at 23°–26° C. by occasional use of an ice water bath. The resulting solution was stirred one hour and poured into 1 l of ice water.

The precipitate was filtered and dissolved in 500 ml of chloroform. The chloroform solution was washed with 2×300 ml water, dried over anhydrous magnesium sulfate and concentrated on a rotary evaporator to a black glass. The glass was melted, poured into a mortar, cooled and powdered giving 136.4 g showing the same nmr spectrum as recorded in Example 1 above. A portion of the product was bulb-to-bulb distilled, had mp 115°–117°, and analyzed for C, 42.34, 42.34; H, 2.10, 2.10; N, 6.53, 6.38.

EXAMPLE 3

Synthesis of bis(aminophenol)AF [4,4'-[2,2,-Trifluoro-1-(trifluoromethyl)-ethylidene]-bis(2-aminophenol)]

A solution of 12.8 g (0.03 mole) of bis(nitrophenol)AF prepared as in Example 1 above, in 125 ml absolute ethanol was hydrogenated at 25° C. and 344.7 kPa (50 psi) hydrogen pressure using 0.5 g of 10% palladium on carbon as catalyst. After hydrogen uptake ceased, the mixture was filtered and the filtrate was concentrated under reduced pressure to 10 g of grey solid. An nmr spectrum in deuterated dimethyl sulfoxide showed two absorptions of equal area at $\delta 3.6$ and $\delta 6.2$–6.7.

EXAMPLE 4

Synthesis of bis(aminophenol)AF

A solution of 50 g of distilled bis(nitrophenol)AF prepared as in Example 2 above, in 200 ml absolute ethanol was hydrogenated at 25° C. and 344.7 kPa (50 psi) hydrogen pressure using 3.0 g of 5% palladium on carbon as catalyst. After hydrogen uptake ceased, the mixture was filtered and the filtrate was concentrated under reduced pressure to a dark solid. The solid was washed on a sintered glass funnel with 3×20 ml cold ethyl ether. The solid was recrystallized under argon from a deoxygenated mixture of 80 ml ethanol and 120 ml water. The white needles were filtered and washed with a small amount of fresh solvent. The filtrate and washing were concentrated under argon to 150 ml and cooled giving a second crop. The combined crops were dried overnight at 1.0 mm and 25° C. giving 29.4 g (68%) of product, mp >225° C. Anal. Calcd for $C_{15}H_{12}F_6N_2O_2$; C, 49.19; H, 3.30; N, 7.65. Found C, 49.39, 49.67; H, 3.39, 3.45; N, 7.62, 7.71.

EXAMPLES 5–11

Vulcanization of the Terpolymer of Tetrafluoroethylene, Perfluoro-(methyl vinyl ether) and Perfluoro-(8-cyano-5-methyl-3,6-dioxa-1-octene) with Bis(aminophenol)AF Samples of the terpolymer containing about 0.7 mole % of the cure site monomer were mixed with compounding ingredients on a two-roll rubber mill. Slabs and O-rings were press cured, post-cured and tested. Compounding, curing and testing data are given in Table 1. In each case the terpolymer cured to give attractive vulcanizates with excellent physical properties.

Each of the samples in Examples 5–10 was post cured under the following conditions:
90°/4 hr.
90° to 204°/6 hr.
204°/18 hr.
204° to 288°/6 hr.
288°/18 hr.

The samples in Example 11 were post cured under the following conditions:
90°/6 hr.
90° to 305°/10 hr.
305°/26 hr.

TABLE 1

| Example No. | 5 | 6 | 7 | 8 |
|---|---|---|---|---|
| Compound Recipe | | | | |
| Terpolymer | 100 | 100 | 100 | 100 |
| Dicyclohexyl-18-Crown-16 | 0.5 | 0.5 | 0.5 | 0.5 |
| Bis(aminophenol)AF | 1.5 | 2 | 3 | 2 |
| Carbon Black SAF | 10 | 10 | 10 | 10 |
| Litharge | | | | |
| Press Cure Temperature | 190° | 190° | 190° | 210° |
| Micro ODR (190°) | | | | |
| Δ Torque (30 min) | 3 | 2 | 2 | 9 |
| Δ Torque (60 min) | 7 | 5 | 5 | 15 |
| Compression Set (70 hr/204° C.) (O-Rings) | 42 | 44 | 48 | 45 |
| Tensile Properties (25° C.) (ASTM D412-Method A, Small Dumbbells) | | | | |
| Stress at 100% elongation (MPa) | 8.6 | 5.4 | 4.5 | 5.0 |
| Stress at break (MPa) | 19.6 | 15.2 | 14.2 | 18.2 |
| Elongation at break (%) | 145 | 160 | 170 | 185 |
| Example No. | 9 | 10 | 11 | |
| Compound Recipe | | | | |
| Terpolymer | 100 | 100 | 100 | |
| Dicyclohexyl-18-Crown-16 | 0.5 | 0.5 | 0.5 | |
| Bis(aminophenol)AF | 2 | 2 | 2 | |
| Carbon Black SAF | 10 | 10 | 10 | |
| Litharge | | 2 | 2 | |
| Press Cure Temperature | 177° | 190° | 190° | |
| Micro ODR (190°) | (177°) | | | |
| Δ Torque (30 min) | 4 | 8 | 8 | |
| Δ Torque (60 min) | 6 | 15 | 14 | |
| Compression Set (70 hr/204° C.) (O-Rings) | 46 | 46 | 39 | |
| Tensile Propeties (25° C.) (ASTM D412-Method A, Small Dumbbells) | | | | |
| Stress at 100% elongation (MPa) | 5.0 | 6.0 | 4.5 | |
| Stress at break (MPa) | 17.8 | 15.6 | 13.2 | |
| Elongation at break (%) | 180 | 160 | 155 | |

EXAMPLE 12

Thermal Stability of the Cured Polymer

Small dumbbells and O-rings from Example 10 were heated in a circulating air oven at 316° C. for 6 days. The samples were intact and flexible after this period. The O-rings showed compression set (70 hr/204° C.) of 38%. Tensile properties measured on the dumbbells at 25° C. were stress at 100% elongation=2.2 MPa, stress at break=14.2 MPa, elongation at break=305%.

EXAMPLE 13

Hydrolytic Stability of the Cured Polymer

Small dumbbells from the composition of Example 11 were suspended in a water filled metal pressure tube and heated at 232° C. for 3 days. The recovered dumbbells were intact and flexible. The dumbbells were dried in a nitrogen purged vacuum oven at 85° C. overnight. Measured tensile properties at 25° C. were stress at 100% elongation=1.9 MPa, stress at break=6.1 MPa, elongation at break=340%.

EXAMPLES 14–17

Vulcanization of the Terpolymer of Tetrafluoroethylene, Perfluoro-(methyl vinyl ether) and Perfluoro-(8-cyano-5-methyl-3,6-dioxa-1-octene)

Samples of the terpolymer containing about 0.7 mole % of the cure site monomer were mixed with compounding ingredients on a two-roll rubber mill. Slabs and O-rings were press cured at 190° C. for 0.5 hr, post cured at 90°/4 hr, 90° to 204°/6 hr, 204°/18 hr, 204° to 288°/6 hr, 288°/18 hr and tested. The compounding, curing and testing data are given in Table 2.

TABLE 2

| Example No. | 14 | 15 | 16 | 17 |
|---|---|---|---|---|
| Compound Recipe | | | | |
| Terpolymer | 100 | 100 | 100 | 100 |
| Dicyclohexyl-18-Crown-16 | 0.5 | 0.5 | 0.5 | 0.5 |
| 4,4'-Sulfonylbis(2-aminophenol) | 1.5 | 1.5 | — | — |
| 3,3'-Diaminobenzidine | — | — | 1.5 | — |
| 3,3',4,4'-Tetraaminobenzophenone | — | — | — | 1.5 |
| Carbon Black SAF | 10 | 10 | 10 | 10 |
| Litharge | — | 2 | — | — |
| Micro ODR (190°) | | | | |
| Δ Torque (30 min) | 4 | 5 | 7 | 2 |
| Δ Torque (60 min) | 5 | 9 | 10 | 3 |
| Compression Set (70 hr/204° C.) (O-Rings) | 73 | 77 | 56 | 98 |
| Tensile Properties (ASTM D412-Method A, Small Dumbbells) | | | | |
| Stress at 100% elongation (MPa) | 4.0 | 4.3 | 4.6 | 3.0 |
| Stress at break (MPa) | 18.4 | 16.9 | 10.0 | 16.5 |
| Elongation at break (%) | 200 | 180 | 145 | 195 |

Industrial Applicability

The vulcanizable perfluoroelastomer compositions of the present invention are useful in the manufacture of finished parts such as O-rings, flange seals, gasket stock, pump diaphragms and liners. The extraordinary physical properties and resistance to environmental attack make these polymers particularly well suited for applications in process streams subject to severe fluid service at in-line temperatures as high as 700° F. or in streams carrying highly corrosive fluids, such as hydrogen sulfide, and for applications where improved thermal and hydrolytic stability would be required.

Best Mode

Although the best mode of the present invention, i.e., the single best composition of the present invention, will depend upon the particular desired end use and the specific requisite combination of properties for that use, the single most preferred composition of the present invention is that described in detail in Example 11.

I claim:

1. A vulcanizable perfluoroelastomer composition comprising
   (a) a copolymer consisting essentially of copolymerized units of:
      (1) 53–79.8 mole percent tetrafluoroethylene,
      (2) 20–45 mole percent perfluoromethyl perfluorovinyl ether and
      (3) 0.2–2 mole percent of a cure site monomer of the formula:

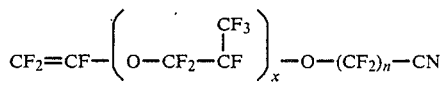

where n=1–4 and x=1–2, and
   (b) 0.5–5.0 parts by weight per 100 parts by weight of the copolymer of a vulcanizing agent selected from the group consisting of bisaminophenols of the formula

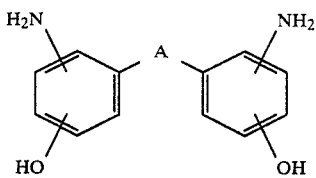

and tetraamines of the formula

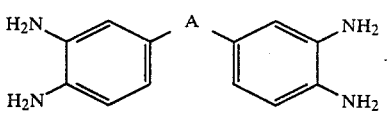

where A is $SO_2$, O, CO, alkyl of 1–6 carbon atoms, perfluoroalkyl of 1–10 carbon atoms, or a carbon-carbon bond linking the two aromatic rings.

2. The composition of claim 1 wherein the copolymer (a) consisting essentially of copolymerized units of:
   (1) 64.4–72.6 mole percent tetrafluoroethylene,
   (2) 27–35 mole percent perfluoromethyl perfluorovinyl ether, and
   (3) 0.4–1.0 mole percent of a compound of the formula:

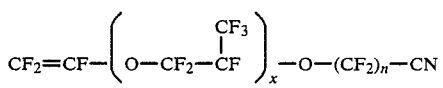

where n=2–3.

3. The composition of claim 2 wherein the component monomer (3) in copolymer (a) comprises perfluoro-(8-cyano-5-methyl-3,6-dioxa-1-octene).

4. The composition of claim 3 wherein component monomer (1) of copolymer (a) comprises about 69.3 mole percent, component monomer (2) of copolymer (a) comprises about 30 mole percent, and component monomer (3) of copolymer (a) comprises about 0.7 mole percent.

5. The composition of claim 1 wherein the moiety A in the bisaminophenol and tetraamine vulcanizing agent (b) is $SO_2$, perfluoroalkyl of 1–10 carbon atoms, or a carbon-carbon bond linking the two aromatic rings.

6. The composition of claim 5 wherein the vulcanizing agent (b) is selected from the group consisting of:
   (1) 4,4'-[2,2,2,-trifluoro-1-(trifluoromethyl)-ethylidene]bis(2-aminophenol),
   (2) 4,4'-sulfonylbis(2-aminophenol),
   (3) 3,3'-diaminobenzidene, and
   (4) 3,3',4,4'-tetraaminobenzophenone.

7. The composition of claim 6 wherein the vulcanizing agent (b) is 4,4'-[2,2,2,-trifluoro-(trifluoromethyl)-ethylidene]bis(2-aminophenol).

8. The composition of claim 1 wherein the vulcanizing agent (b) is present in the amount of 1.0-2.0 parts per 100 parts by weight of the copolymer.

9. A method of vulcanizing a perfluoroelastomer, wherein the perfluoroelastomer consisting essentially of copolymerized units of:
(1) 53-79.8 mole percent tetrafluoroethylene,
(2) 20-45 mole percent perfluoromethyl perfluorovinyl ether and
(3) 0.2-2 mole percent of a cure site monomer of the formula:

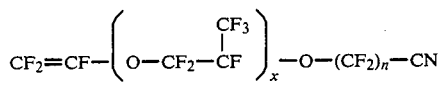

where n=1-4 and x=1-2, and said method comprising mixing with the perfluoroelastomers 0.5-5.0 parts by weight per 100 parts by weight of the copolymer of a vulcanizing agent selected from the group consisting of bisaminophenols of the formula

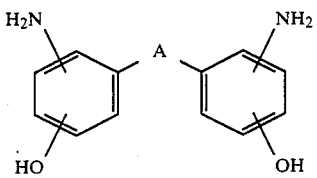

and tetraamines of the formula

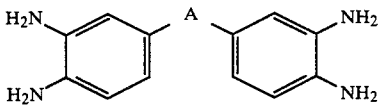

where A is $SO_2$, O, CO, alkyl of 1-6 carbon atoms, perfluoroalkyl of 1-10 carbon atoms, or a carbon-carbon bond linking the two aromatic rings and heating the mixture to 160°-210° C. for 30-60 minutes.

10. A vulcanized article made from the compostion of claim 1.

* * * * *